United States Patent [19]

Bouillon et al.

[11] 3,862,305

[45] Jan. 21, 1975

[54] BACTERICIDAL, FUNGICIDAL AND DEODORIZING COMPOSITIONS CONTAINING DERIVATIVES OF PYRIDINE N-OXIDE

[75] Inventors: Claude Bouillon, Eaubonne; Gregoire Kalopissis, Paris; Gerard Lang, Deuil-la-Barre, all of France

[73] Assignee: Societe anonyme dite: L'Oreal, Paris, France

[22] Filed: Dec. 29, 1971

[21] Appl. No.: 213,729

[30] Foreign Application Priority Data
Dec. 31, 1970 Luxembourg .......................... 62350

[52] U.S. Cl. ............ 424/45, 252/DIG. 13, 252/106, 260/270 R, 260/294.8 R, 424/DIG. 1, 424/DIG. 2, 424/DIG. 4, 424/46, 424/47, 424/63, 424/65, 424/67, 424/70, 424/71, 424/245, 424/248, 424/250, 424/263, 424/267, 424/273, 424/274
[51] Int. Cl. ............................................. A61k 7/00
[58] Field of Search .............. 424/263; 260/294.8 R; 252/106

[56] References Cited
UNITED STATES PATENTS
3,629,452 12/1971 Kalopissis et al. .............. 424/263 X
3,671,643 6/1972 Kalopissis ...................... 424/263 X
3,700,676 10/1972 Damico .......................... 424/263 X Primary Examiner—Jerome D. Goldberg
Assistant Examiner—Vera C. Clarke
Attorney, Agent, or Firm—Cushman, Darby & Cushman

[57] ABSTRACT

A composition for application to the skin or scalp, said composition having fungicidal, bactericidal and deodorizing characteristics comprises in a carrier selected from the group consisting of water, a lower alkanol selected from the group consisting of ethanol and isopropanol, an aqueous solution of said lower alkanol wherein said lower alkanol is present in amounts of about 20–70 percent by weight of said solution, talc and detergent, 0.01–10 percent by weight of said composition of at least one active component having the formula

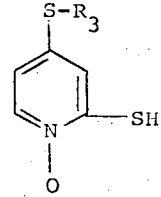

wherein $R_3$ is $-(CH_2)_n-COR_6$ wherein $R_6$ is selected from the group consisting of OH and $-O-R'_6$ wherein $R'_6$ is alkyl having 1–4 carbon atoms, and $n$ is 1–10 inclusive.

4 Claims, No Drawings

BACTERICIDAL, FUNGICIDAL AND DEODORIZING COMPOSITIONS CONTAINING DERIVATIVES OF PYRIDINE N-OXIDE

The present invention relates to new cosmetic compositions containing derivatives of pyridine N-oxide, to new compounds derived from pyridine N-oxide and to processes for preparing said compounds.

These new cosmetic compositions containing the derivatives of pyridine N-oxide can be employed as compositions to combat greasy hair and scalp as well as hygiene products, the derivatives of pyridine N-oxide according to the present invention having in particular good fungicidal and bactericidal characteristics.

It has already been proposed to employ as cosmetic compositions those containing certain derivatives of pyridine N-oxide, these derivatives having the formula

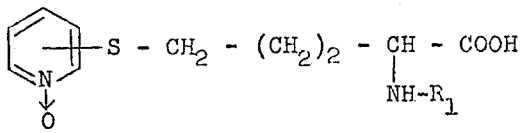

wherein n is equal to 0 or 1, the sulfur atom being fixed to the N-oxypyridyl-2 radical ortho or para to the NO group, $R_1$ represents a member selected from the group consisting of hydrogen, $COR_2$ and $SO_2R_2$ wherein $R_2$ represents a member selected from the group consisting of alkyl having 1–4 carbon atoms, phenyl and tolyl. These derivatives are generally used in amounts of 0.01–10 percent by weight of the cosmetic composition.

However, it has now been found that the pyridine N-oxide derivatives of the present invention when compared to those N-oxypyridyl-2 substituted cysteine or homologous thiols discussed above, exhibit even better properties.

More particularly, the present invention relates to cosmetic compositions containing, in a suitable cosmetic carrier or vehicle, at least one compound having the formula:

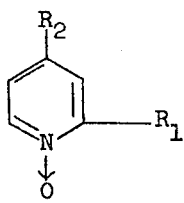     (I)

wherein
$R_2$ is selected from the group consisting of
a. $NO_2$ in which case, $R_1$ represents a member selected from the group consisting of $-S-R_3$, $-SO-R_3$ and $-SO_2-R_3$;
b. a chlorine, in which case, $R_1$ is selected from the group consisting of $-S-R_3$, $-SOR_3$, $SO_2R_3$ and $-S-R_4$;
c. $-S-R_3$;
d. $-SO-R_3$; and
e. $-SO_2-R_3$;
where in cases (c), (d) and (e), $R_1$ represents a member selected from the group consisting of halogen, $-S-R_3$, $-SO-R_3$, $-SO_2R_3$ and $-S-R_4$,
$R_3$ being selected from the groups consisting of
1. a saturated or unsaturated, linear or branched aliphatic chain having 1–18 carbon atoms;
2. m

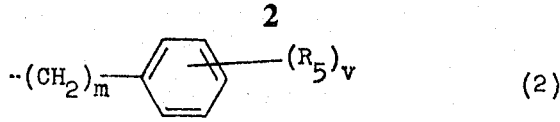     (2)

wherein $R_5$ represents a member selected from the group consisting of hydrogen, lower alkyl having 1–4 carbon atoms in which case v is equal to 1 and a halogen selected from the group consisting of chlorine, bromine and fluorine, in which case v is equal to 1–5, and m is equal to 0, 1 or 2;
3. $-(CH_2)_n-COR_6$ wherein $R_6$ is selected from the group consisting of $-OH$, $-O-R_6'$ wherein $R_6'$ represents alkyl having 1–4 carbon atoms, $-NHOH$, $-NH-NH_2$, $-NH_2$ and

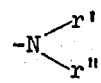

wherein $r'$ and $r''$ each represent alkyl having 1–2 carbon atoms or together form a divalent radical selected from the group consisting of $-(CH_2)_4-$, $-(CH_2)_5-$, $-(CH_2)_2-O-(CH_2)_2-$ and

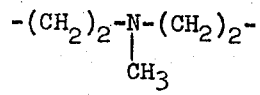

and n is equal to 1–10 inclusive;
4. $-(CH_2)_pNHR_7$ wherein $R_7$ represents a member selected from the group consisting of hydrogen except when $R_1$ represents a halogen or except when $R_2$ represents chlorine or a radical $-NO_2$, mesyl, tosyl and $-COR^{IV}$ wherein $R^{IV}$ represents a member selected from the group consisting of alkyl having 1–18 carbon atoms, alkenyl having 1–18 carbon atoms and $-NH_2$, and p is equal to 2–3;
5. $-CH_2-(CHOH)_q-CH_2OH$, q being 0 or 1;
6.

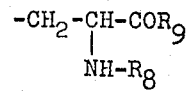

wherein $R_8$ is selected from the group consisting of hydrogen except when $R_1$ is halogen, and $-COR'_8$ wherein $R'_8$ is alkyl having 1–3 carbon atoms, and wherein $R_9$ is selected from the group consisting of $NH_2$ and $-OR'_9$ wherein $R'_9$ is selected from the group consisting of hydrogen and alkyl having 1–4 carbon atoms; and
7.

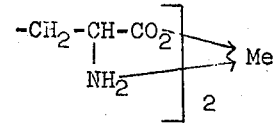

wherein Me represents a metal selected from the group consisting of zinc, iron (FeII), cadmium and manganese; and
$R_4$ being selected from the group consisting of
1. hydrogen, in this case the compound can be in the form of a metal salt, amine or in the form of a corresponding disulfide;
2.

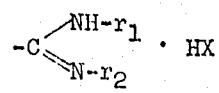

wherein $r_2$ is hydrogen and $r_1$ is selected from the group consisting of hydrogen and

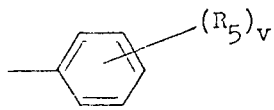

wherein $R_5$ and $v$ have the meaning given above, or $r_1$ and $r_2$ together form the divalent radical $-(CH_2)_2-$ and X is halogen;

3.

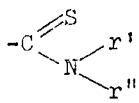

wherein $r'$ and $r''$ have the meaning given above;

4. $-C \equiv N$; and

5.

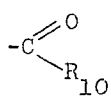

wherein $R_{10}$ is selected from the group consisting of alkyl having 1–18 carbon atoms, phenyl and phenyl substituted with a member selected from the group consisting of chlorine, bromine and fluorine.

The metal salts which are used in the cosmetic compositions of the present invention can have the formula:

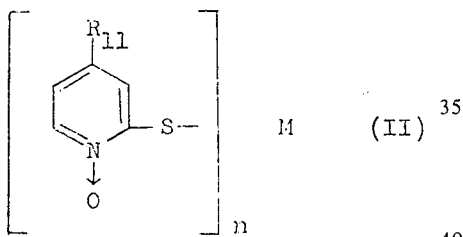

wherein $R_{11}$ is selected from the group consisting of halogen, $-S-R_3$, $-SO-R_3$ and $SO_2-R_3$ wherein $R_3$ has the meaning given above, and M is selected from the group consisting of a metal selected from the group consisting of zinc, iron, manganese, tin, cadmium, zirconium and alkali or alkaline earth metals such as sodium, potassium, calcium, barium and lithium, AlOH or molybdenum oxide and $n$ being a whole number corresponding to the valence of M.

The disulfides usefully employed in the cosmetic compositions of the present invention can be represented by the formula:

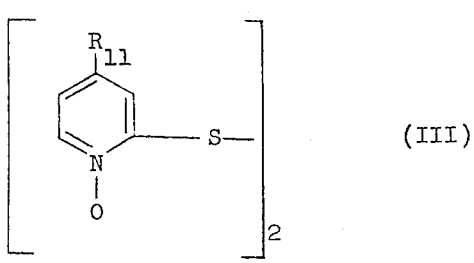

wherein $R_{11}$ has the meaning given above.

The present invention is even more particularly concerned with a cosmetic composition containing as an active ingredient at least one compound selected from the group consisting of 4-benzylthio 2-chloro pyridine N-oxide, (1)
S-(2-chloro 4-pyridyl N-oxide) ethyl thioglycolate, (2)
S-(2-chloro 4-pyridyl N-oxide) methyl thioglycolate, (3)
2-chloro 4-(2,3-dihydroxy propylthio)pyridine N-oxide, (4)
2-chloro 4-dodecylthio pyridine N-oxide, (5)
2-chloro 4-hexadecylthio pyridine N-oxide, (6)
2-dodecylthio 4-nitro pyridine N-oxide, (7)
2-hexadecylthio 4-nitro pyridine N-oxide, (8)
2-benzylthio 4-nitro pyridine N-oxide, (9)
(4-nitro 2-pyridyl N-oxide) mercaptoacetic acid, (10)
S-(4-benzylthio N-oxypyridyl-2) isothiouronium chloride, (11)
S-(4-phenylthio N-oxypyridyl-2) mercaptoacetamide, (12)
S-(4-dodecylthio N-oxypyridyl-2) mercaptoacetic acid, (13)
3-(4-dodecylthio N-oxypyridyl-2 thio) propionic acid, (14)
bis - (2,4-benzylthio) pyridine N-oxide, (15)
S-(2-dodecylthio N-oxypyridyl-4) mercaptoacetic acid, (16)
4-dodecylthio N-oxypyridyl-2 thiocyanate, (17)
S-(4-chloro N-oxypyridyl-2) cysteine, (18)
S-(4-chloro N-oxypyridyl-2) isothiouronium chloride, (19)
N,N-dimethyldithiocarbamate of 4-chloro N-oxypyridyl-2, (20)
4-benzylthio N-oxypyridyl-2 thiol, (21)
S-(2-mercapto N-oxypyridyl-4) methyl thioglycolate and its zinc salt, (22)
4-dodecylthio N-oxypyridyl-2 thiol, (23)
4-chloro N-oxypyridyl-2 thiol, (24)
4-butylsulfonyl 2-chloro pyridine N-oxide, (25)
S-(4-methyl sulfonyl N-oxypyridyl-2) methyl cysteinate hydrochloride, (26)
4-dodecylthio N-oxypyridyl-2 zinc thiolate, (27)
4-p-chlorophenylthio N-oxypyridyl-2 disulfide, (28)
S-[4-(carboxymethylthio) N-oxypyridyl-2] cysteine, (29)
S-[4-(2,3-dihydroxy propyl sulfinyl) N-oxypyridyl-2] iron ($Fe_{II}$) cysteinate, (30)
2-(2,3-dihydroxy propylthio) 4-(2-ethyl hexylthio) pyridine N-oxide, (31)
[4-(t-butyl-4 phenylthio)N-oxypyridyl-2] sulfonylacetic acid, (32)
4-dodecylsulfonyl 2-octadecylsulfinyl pyridine N-oxide, (33)
3-(9-octadecene 4-ylthio N-oxypyridyl-2) propionhydrazide, (34)
4-benzylsulfinyl 2-pyrroldiniocarbonyl methylthio pyridine N-oxide, (35)
4-methylsulfonyl N-oxypyridyl-2 sodium thiolate, (36)
4-octylsulfinyl N-oxypyridyl-2 hydroxy aluminum thiolate, (37)
4-m-fluorobenzylthio N-oxypyridyl-2 manganese thiolate, (38)
4-methoxycarbonylethylthio N-oxypyridyl-2 calcium thiolate, (39)

4-(2-propionamido ethylthio) N-oxypyridyl-2 cadmium thiolate, (40)
S,S'-[2,2-dithio bis(N-oxypyridyl-4)] bis-(mercaptoacetic acid), (41)
S,S'[2,2-dithio biz(N-oxypyridyl-4)] bis-(2-acetamido 3-mercapto propionic acid) (42)
2,2'-dithio bis-[4-(octadecene-9 yl sulfinyl)]pyridine N-oxide, (43)
2-(4-chloro N-oxypyridyl-2 thio) imidazolinium chloride, (44)
2-(4-methylthio N-oxypyridyl-2 thio) imidazolinium chloride, (45)
4-benzylsulfinyl N-oxypyridyl-2 thiocyanate, (46)
S-(4-methylsulfinyl N-oxypyridyl-2) N-phenylisothiouronium chloride, (47)
p-chlorothiobenzoate of S-(4-octylthio N-oxypyridyl-2), (48)
2-acetamido 3-(4-nitro N-oxypyridyl-2 thio) methyl propionate, (49)
S-(4-nitro N-oxypyridyl-2) cadmium cysteinate, (50)
2-(2-acetamido ethylthio) 4-chloro pyridine N-oxide, (51)
4-chloro 2-(2,3-dihydroxy propylthio) pyridine N-oxide, (52)
4-chloro 2-(2,3-dihydroxy propyl sulfonyl) pyridine N-oxide, (53)
4-chloro 2-(2-methylsulfonamido ethylsulfinyl) pyridine N-oxide, (54)
3-(4-chloro N-oxypyridyl-2 thio) 2-butyramido propionamide, (55)
S-(4-chloro N-oxypyridyl-2) manganese cysteinate, (56)
3-(4-chloro N-oxypyridyl-2 thio) butyl propionate, (57)
4-chloro 2-ethylsulfonyl pyridine N-oxide, (58)
4-chloro 2-hexadecylsulfinyl pyridine N-oxide, (59)
4-chloro 2-o-fluorobenzylthio pyridine N-oxide, (60)
4-chloro 2-tolythio pyridine N-oxide, (61)
2-chloro 4-(3-propionamido propylthio) pyridine N-oxide, (62)
3-(2-chloro N-oxypyridyl-4 sulfinyl) propionic acid, (63)
2-chloro 4-(2-hydroxy ethylsulfonyl) pyridine N-oxide, (64)
S-(2-chloro N-oxypyridyl-4) ω-mercapto methyl undecanoate, (65)
2-chloro 4-methylsulfonyl pyridine N-oxide, (66)
2-chloro 4-(2-p-toluene sulfonamido ethylthio) pyridine N-oxide, (67)
2-acetamido 3-(2-chloro N-oxypyridyl-4 thio) ethyl propionate, (68)
S-(4-p-chlorophenylthio N-oxypyridyl-2) mercaptoacetic acid, (69)
S-(4-phenylethyl sulfonyl N-oxypyridyl-2) isothiouronium chloride, (70)
S-(2-hexadecylsulfonyl N-oxypyridyl-4) mercaptoacethydroxamic acid, (71)
2-p-chlorobenzylsulfinyl 4-decylthio 2-pyridine N-oxide, (72)
2-methylthio 4-nitro pyridine N-oxide, (73)
2-octylthio 4-nitro pyridine N-oxide, (74)
2-octadecylthio 4-nitro pyridine N-oxide, (75)
2-(octadecene-9 ylthio) 4-nitro pyridine N-oxide, (76)
2-(undecene-10 ylthio) 4-nitro pyridine N-oxide, (77)
2-(4-t-butyl phenylthio) 4-nitro pyridine N-oxide, (78)
2-phenylethylthio 4-nitro pyridine N-oxide, (79)
2-o-chlorobenzylthio 4-nitro pyridine N-oxide, (80)
2-(3,4-dichloro benzylthio) 4-nitro pyridine N-oxide, (81)
2-m-fluorobenzylthio 4-nitro pyridine N-oxide, (82)
2-o-tolylthio 4-nitro pyridine N-oxide, (83)
2-pentachlorophenylthio 4-nitro pyridine N-oxide, (84)
2-(2,4-dichloro phenylthio) 4-nitro pyridine N-oxide, (85)
2-p-bromophenylthio 4-nitro pyridine N-oxide, (86)
S-(4-nitro N-oxypyridyl-2) 11-mercapto undecanoic acid, (87)
(4-nitro N-oxypyridyl-2) butyl sulfinylacetate, (88)
S-(4-benzylthio N-oxypyridyl-2) thiolacetate, (89)
2-(2-hydroxy ethylthio) 4-nitro pyridine N-oxide, (90)
2-tetradecylsulfinyl 4-nitro pyridine N-oxide, (91)
(2-ethyl hexyl) 2-sulfinyl 4-nitro pyridine N-oxide, (92)
2-p-fluorobenzyl sulfonyl 4-nitro pyridine N-oxide, (93)
2-(2,4-dichloro benzylsulfinyl) 4-nitro pyridine N-oxide, (94)
2-(2,3-dihydroxy propylsulfinyl) 4-nitro pyridine N-oxide, (95)
4-nitro 2-(2-propionamido ethylsulfonyl) pyridine N-oxide, (96)
2-(2-morpholinocarbonyl ethylthio) 4-propylsulfinyl pyridine N-oxide, (97)
2-(β-amino-ethylthio) 4-tertiobutylthio pyridine N-oxide hydrochloride, (98)
4-(β-ureido ethylthio) N-oxypyridyl-2 triethanolamine thiolate, (99)
4-(2-octadecanamido ethylthio) N-oxypyridyl-2 piperidine thiolate, (100)
S-(4-chloro N-oxypyridyl-2) butyl cysteinate, (101)
4-[2-(9-octadecene amido) ethylthio] N-oxypyridyl-2 pyrrolidinocarbodithioate, (102)
N-(p-chlorophenyl) S-(4-chloro N-oxypyridyl-2) isothiouronium chloride, (103)
S-(4-chloro N-oxypyridyl-2) octadecanethioate, (104)
2-2'-dithio bis-(4-chloro pyridine N-oxide), (105)
4-benzylsulfonyl N-oxypyridyl-2 thiol, (106)
2-chloro 4-tetradecylthio pyridine N-oxide, (107)
4-nitro 2-tetradecylthio pyridine N-oxide, (108)
S-[4-(2-ethyl hexylthio) N-oxypyridyl-2] mercaptoacetic acid, (109)
S-(4-tetradecylthio N-oxypyridyl-2) mercaptoacetic acid, (110)
S-(4-octadecylthio N-oxypyridyl-2) mercaptoacetic acid, (111)
S-[4-benzylthio N-oxypyridyl-2] cysteine, (112)
4-nitro 2-phenylthio pyridine N-oxide, (113)
S-(4-chloro N-oxypyridyl-2) cysteine, (114)
S-(4-chloro N-oxypyridyl-2) methyl cysteinate dihydrochloride, (115)
4-methylsulfonyl 2-chloro pyridine N-oxide, (116)
S-(4-nitro N-oxypyridyl-2) mercaptoacetic acid, (117)
4-chloro 2-phenylthio pyridine N-oxide, (118)
2-benzylsulfonyl 4-nitro pyridine N-oxide, (119)
bis-2,4-(benzylsulfonyl) pyridine N-oxide, (120)

2-benzylsulfinyl 4-benzylsulfonyl pyridine N-oxide, (121)
2-benzylsulfinyl 4-nitro pyridine N-oxide, (122)
4-benzylthiosulfonyl 2-benzylthio pyridine N-oxide, (123)
4-benzylsulfinyl 2-chloro pyridine N-oxide, (124)
bis-(2,4-benzylsulfinyl)pyridine N-oxide, (125) and
4-benzylsulfinyl 2-benzylsulfonyl pyridine N-oxide. (126)

The cosmetic compositions of the present invention contain at least one pyridine N-oxide derivative defined above in amounts, preferably, of about 0.01–10 percent by weight thereof. These compositions can be advantageously used by applying the same to the scalp to combat, or substantially eliminate, a greasy appearance of the hair and scalp.

The compositions of the present invention can be provided in a variety of forms such as aqueous or hydroalcoholic solutions and/or suspensions which can comprise a lotion for the care of the scalp. Representative alcohols employed to provide a hydroalcoholic solution of suspension include ethanol and isopropanol, the alcohol being present generally in amounts of about 20–70 percent by weight thereof.

The cosmetic compositions of the present invention can also be in the form of a hair setting lotion containing, in addition to the active ingredient defined above, a conventional cosmetic resin in amounts of about 0.5–6, and preferably about 1–3 percent, by weight.

Among the usable cosmetic resins according to the invention there can be mentioned: polyvinylpyrrolidone having a molecular weight ranging, for instance, between 10,000 and 700,000; polyvinylpyrrolidone/vinyl acetate copolymer; copolymers of vinyl acetate and an unsaturated carboxylic acid such as crotonic acid; copolymers resulting from the polymerization of vinyl acetate, crotonic acid and an acrylic methacrylic ester; copolymers resulting from the copolymerization of vinyl acetate and a vinyl alkyl ether; copolymers resulting from the copolymerization of vinyl acetate, crotonic acid and a vinyl ester of a long carbon-chain acid or else an allyl or methallyl ester of a long carbon-chain acid; copolymers resulting from the copolymerization of an ester derived from an unsaturated alcohol and a short chain carboxylic acid, a short carbon chain unsaturated acid and at least one ester derived from a short chain saturated alcohol and an unsaturated acid; and polymers resulting from the polymerization of at least one unsaturated ester and at least one unsaturated acid.

The novel cosmetic compositions of this invention can also be in the form of a hair-setting cream or gel. The active compounds according to the invention can also be included in the formulation of numerous other cosmetic compositions, such as aerosol lacquers which are intended to set the hair, reducing compositions that can be used for the first step of a permanent wave technique and oxidizing or bridging compositions that can be used to perform the second step of a permanent wave technique. Representative reducing agents that can be used for the first step in a permanent wave technique are those selected from the group consisting of thioglycolic acid, ammonium thioglycolate, thioglycerol, thiolactic acid and thioglycolamide. Representative oxidizing or bridging agents include those selected from the group consisting of hydrogen peroxide, sodium or potassium bromate and sodium perborate or percarbonate.

The active compounds according to the present invention can also be included in shampoo preparations having as a base an anionic, cationic, nonionic or amphoteric detergent.

The shampoos according to the invention can contain anionic detergents such as: alkyl sulfates, alkyl ether sulfates, alkyl polyether sulfates, alkyl sulfonates, in which the alkyl groups have 8–18 carbon atoms, sulfated monoglycerides, sulfonated monoglycerides, sulfated alkanolamides, sulfonated alkanolamides, soaps of fatty acids, monosulfosuccinates of fatty alcohols, the condensation product of fatty acids with methyltaurine, the condensation product of fatty acids with sarcosine and the condensation product of fatty acids with a protein hydrolysate. Representative cationic detergents also include long chain quaternary ammoniums, esters of fatty acids and of amine alcohols, and polyether amines. Non-ionic detergents can include the esters of polyols and sugars, the products of the condensation of ethylene oxide with fatty acids, fatty alcohols, long chain alkyl phenyls, long chain mercaptans, long chain amides, and the polyethers of polyhydroxylated fatty alcohols. Amphoteric detergents such as aspargine derivatives, the products of the condensation of monochloroacetic acid and imadazolines, and alkyl aminopropionates can also be used.

Among the nonionic detergents which can be utilized are lauryl alcohol oxyethylenated with 12 moles of ethylene oxide, and $C_{12}$ thiols oxyethylenated with 12 moles of ethylene oxide.

Among the cationic detergents which can be utilized are lauryl benzyl trimethylammonium bromide or chloride, cetyl trimethyl ammonium bromide; myristyl benzyl trimethyl ammonium bromide or chloride and cetyl benzyl trimethyl ammonium bromide or chloride.

Among the amphoteric detergents which can be used are lauryl aminopropionate of a radical derived from copra fatty acids, alkyl dimethyl betaine and a compound having the formula

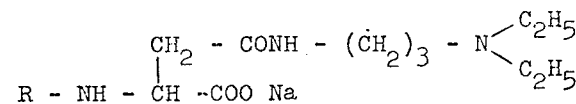

wherein R is equal to ⅔ copra ($C_6$–$C_{18}$ acids) and ⅓ tallow.

The shampoos according to the present invention generally contain from 0.5 to 5 percent, and preferably 1 to 3 percent by weight of said active component. They also contain, for example, from 4 to 15 percent, and preferably from 5 to 7 percent by weight of the detergent compound in an aqueous medium.

The shampoos according to the invention can also contain other conventional cosmetic ingredients, such as perfumes and hair dyes. They may also contain thickening agents such as the alkanolamides of fatty acids, cellulose derivatives (carboxymethylcellulose and hydroxymethylcellulose), esters of long chain polyols, and natural gums so as to take the form of a cream or gel. The shampoos according to the invention can also take the form of a powder adapted to be applied to moistened hair, or to be dissolved in water before being used to wash the hair.

The present invention also has for its object compositions intended to be applied to the skin for treatment of acne, which compositions contain, preferably, from 0.1 to 3 percent by weight of at least one active compound as defined above. These anti-acne compositions can be in the form of a solution, cream, ointment, salve, lotion or milk. They can also constitute makeup products or dermatological cakes containing ingredients standard to this type of composition.

The present invention also has for its object deodorant compositions intended for body hygiene, and particularly feminine hygiene, which compositions contain preferably 0.1 to 3 weight percent of at least one active component as defined above.

These deodorant compositions can be provided in many forms and, in particular, in the form of a soap or an aerosol spray. By aerosol spray is understood mixtures made up of a conventional propellant, a lower alkanol, if desired, and an emollient.

The compounds of the present invention, as indicated above, exhibit excellent antibactericidal and antifungicidal properties. Thus, the present invention is also concerned with a process for treating greasy hair and scalp with the compositions defined above.

The present invention also has for an object some new compounds which are pyridine N-oxide derivatives, these compounds having the formula

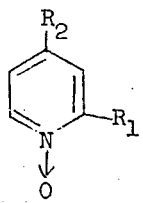

wherein
R$_2$ is selected from the group consisting of
a. NO$_2$, in which case R$_1$ is selected from the group consisting of —S—R$_3$, —SO—R$_3$ and —SO$_2$—R$_3$;
b. chlorine, in which case R$_1$ is selected from the group consisting of —S—R$_3$, —SO—R$_3$, —SO$_2$—R$_3$ and —S—R'$_4$ wherein R'$_4$ is selected from the group consisting of
1.

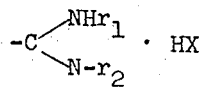

wherein r$_2$ is hydrogen and r$_1$ is

wherein R$_5$ is selected from the group consisting of hydrogen, lower alkyl having 1–4 carbon atoms in which case v is 1 and halogen selected from the group consisting of chlorine, bromine and fluorine in which case v is 1–5 or r$_1$ and r$_2$ together form the divalent radical —(CH$_2$)$_2$—, and X is halogen selected from the group consisting of chlorine and bromine,
2.

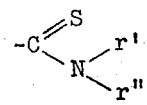

wherein r' and r'' each independently represent alkyl having 1–2 carbon atoms or together form a divalent radical selected from the group consisting of —(CH$_2$)$_4$—, —(CH$_2$)$_5$—, —(CH$_2$)$_2$—O—(CH$_2$)$_2$— and

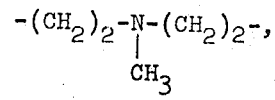

3. —C ≡ N and
4.

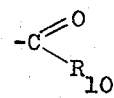

wherein R$_{10}$ is selected from the group consisting of alkyl having 1–18 carbon atoms, phenyl and phenyl substituted with a member selected from the group consisting of chlorine, bromine and fluorine;
c. —S—R$_3$;
d. —SO—R$_3$; and
e. —SO$_2$—R$_3$;
in cases (c), (d) and (e), R$_1$ representing a member selected from the group consisting of halogen, —S—R$_3$, —SO—R$_3$, —SO$_2$—R$_3$ and —S—R$_4$,
R$_3$ is selected from the group consisting of
1. a saturated or unsaturated, linear or branched aliphatic chain having 1–18 carbon atoms,
2.

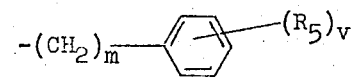

wherein R$_5$ has the meaning given above and m is 0, 1 or 2,
3. —(CH$_2$)$_n$—COR$_6$ wherein R$_6$ is selected from the group consisting of —OH, —O—R'$_6$ wherein R'$_6$ is alkyl having 1–4 carbon atoms, —NHOH, —NH—NH$_2$, —NH$_2$ and

wherein r' and r'' have the meaning given above and n is 1–10 inclusive,
4. —(CH$_2$)$_p$—NHR$_7$ wherein R$_7$ is selected from the group consisting of hydrogen except when R$_1$ is halogen or except when R$_2$ is chlorine or —NO$_2$, mesyl, tosyl and —COR$^{IV}$ wherein R$^{IV}$ is selected from the group consisting of alkyl having 1–18 carbon atoms, alkenyl having 1–18 carbon atoms and —NH$_2$, and p is 2 or 3,
5. —CH$_2$(CHOH)$_q$—CH$_2$OH wherein q is 0 or 1, and
6.

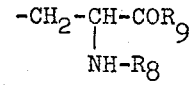

wherein R$_8$ is selected from the group consisting of hydrogen except when R$_1$ is halogen and —COR'$_8$ wherein R'$_8$ is lower alkyl having 1–3 carbon atoms and wherein R$_9$ is selected from the group consisting of NH$_2$ and —OR'$_9$ wherein R'$_9$ is selected from the group consisting of hydrogen and lower alkyl having 1–4 carbon atoms, and
7.

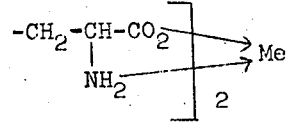

wherein Me is selected from the group consisting of zinc, iron (FeII), cadmium and manganese; and R₄ is selected from the group consisting of
1. hydrogen, in which case said compound can be in the form of a metal salt, amine or corresponding disulfide,
2.

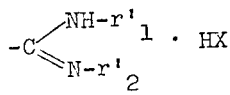

wherein $r'_2$ is hydrogen and $r'_1$ is selected from the group consisting of hydrogen and

wherein R₅ and v have the meaning given above, or together for the divalent radical —(Ch₂)₂—, and X is halogen,
3.

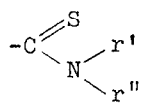

wherein r' and r'' have the meaning given above,
4. —C ≡ N, and
5.

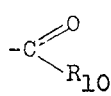

wherein R₁₀ has the meaning given above.

The metal salts according to the present invention have the formula

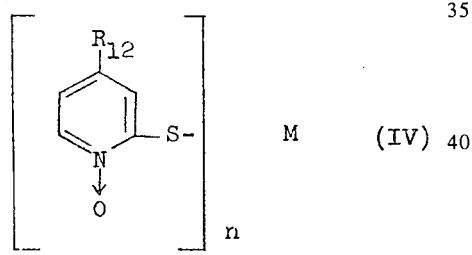

wherein
R₁₂ represents a member selected from the group consisting of —S—R₃, —SO—R₃ wherein R₃ has the meaning given above, M represents a member selected from the group consisting of zinc; iron; manganese; tin; cadmium; zirconium; alkali and alkaline earth metals such as sodium, potassium, calcium, barium and lithium; AlOH and molybdenum oxide, and n is a whole number corresponding to the valence of M.

The disulfides of the present invention have the formula

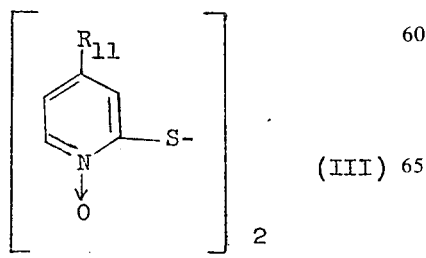

wherein R₁₁ is selected from the group consisting of halogen, —S—R₃, —SO—R₃ and —SO₂R₃ wherein R₃ has the meaning given above.

The present invention has more particularly for an object those compounds selected from the group consisting of
1. a compound having the formula

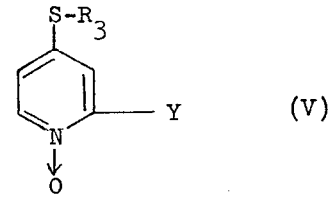

wherein R₃ has the meaning given above and Y is halogen, such as chlorine, bromine or fluorine, with the thioether function of these compounds being able to be oxidized to the sulfone or sulfoxide form;
2. a compound having the formula

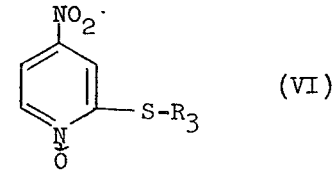

wherein R₃ has the meaning given above, with the thioether function of these compounds being able to be oxidized to the sulfone or sulfoxide form;
3.

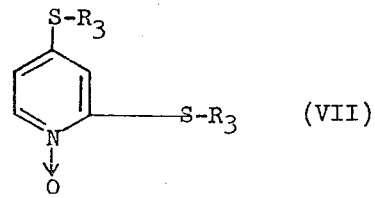

wherein R₃ has the meaning given above, with the thioether function of these compounds being able to be oxidized to the sulfone or sulfoxide form;
4. a compound having the formula

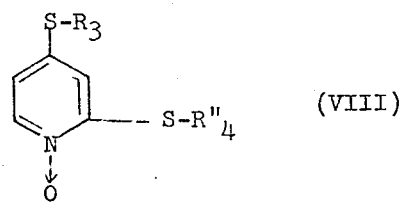

wherein R₃ has the meaning given above and R''₄ is selected from the group consisting of
a.

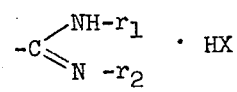

wherein $r_2$ is hydrogen and $r_1$ is selected from the group consisting of hydrogen and

wherein $R_5$ and $v$ have the meaning given above, or $r_1$ and $r_2$ together form the divalent radical $-(CH_2)_2-$ and X is halogen, such as chlorine or bromine, (b) 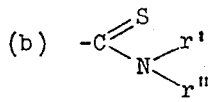

wherein $r'$ and $r''$ have the meaning given above,
c. $-C\ N$ and (d) 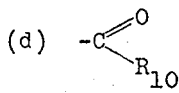

wherein $R_{10}$ has the meaning given above, with the thioether function $-S-R_3$ being able to be oxidized to the sulfone or sulfoxide form;

5. a compound having the formula

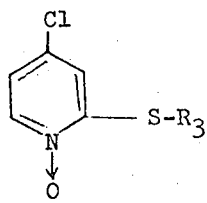 (IX)

wherein $R_3$ has the meaning given above, with the thioether function being able to be oxidized to the sulfone or sulfoxide form, 6. a compound having the formula

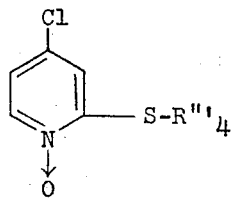 (X)

wherein $R'''_4$ represents a member selected from the group consisting of a.
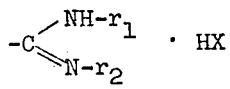 · HX wherein $r_2$ is hydrogen and $r_1$ is selected from the group consisting of hydrogen and

wherein $R_5$ and $v$ have the meaning given above, or $r_1$ and $r_2$ together form the divalent radical $-(CH_2)_2-$ and X is halogen such as chlorine or bromine, b.
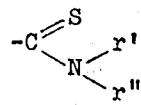

wherein $r'$ and $r''$ have the meaning given above,
c. $-C\equiv N$ and
d.

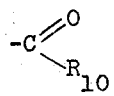

wherein $R_{10}$ has the meaning given above, 7. a compound having the formula

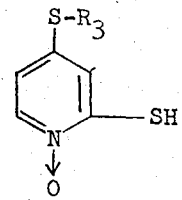 (XI)

wherein $R_3$ has the meaning given above, with the thioether function being able to be oxidized to the corresponding sulfone or sulfoxide, and 8. a compound having the formula

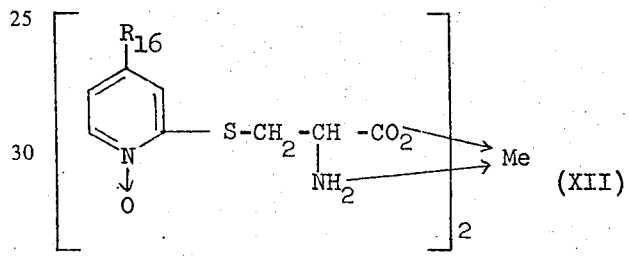 (XII)

wherein $R_{16}$ is selected from the group consisting of chlorine, $-S-R_3$, $-SO-R_3$, $-SO_2-R_3$ and $NO_2$ wherein $R_3$ has the meaning given above, and Me is selected from the group consisting of zinc, iron (FeII), cadmium and manganese.

The present invention also has for an object a process for preparing the new compounds of this invention.

The initial reactant employed to produce the compounds of this invention can be 2-chloro 4-nitro pyridine N-oxide, 2-bromo 4-nitro pyridine N-oxide, 2,4-dichloro pyridine N-oxide and 4-bromo 2-chloro pyridine oxide. While these compounds are known, their use as well as their reaction have been only slightly studied or discussed in the literature.

It has been surprisingly found that it was possible to effect a substitution reaction on the carbon in the 2 or 4 position of a 2-halogeno 4-nitro pyridine N-oxide by means of a thiol of the type $R_3SH$. Thus, by choosing the appropriate reaction conditions, it is possible to favor the preferential formation of a compound corresponding to formula (V) by substitution of a nitro group at position 4, or of a compound corresponding to formula (VI) by substitution of the halogen in position 2.

By subsequent reaction with another molecule of a thiol, identical or different, it is possible to produce, beginning with the compounds (V) and (VI), derivatives responding to formula (VII).

It is thus possible to obtain by two different processes and by successively using the same thiol, identical compounds.

In another embodiment of the present invention, when it is desired to produce compounds corresponding to formula (VII) in which the two substituents in the 2 and 4 position are identical, it is possible to obtain these compounds directly by the action of two molecules of the thiol $R_3SH$ on the 2-halogeno 4-nitro pyridine N-oxide or on the 2,4-dihalogeno pyridine N-oxide.

Finally, it has surprisingly been found that under certain conditions, 2,4-dichloro pyridine N-oxide can be specifically substituted in position 2 with a thiol of the type $R_3SH$ in order to produce compounds having formula (IX), while, under these same conditions, 4-bromo 2-chloro pyridine N-oxide is substituted specifically in the 4 position to give compounds having formula (V) in which Y is equal to bromine.

The preparation of the compounds corresponding to formula (V) starting with 2-halogeno 4-nitro pyridine N-oxide on a thiol having the formula $R_3SH$ is effected in a general way in the presence of a weak base such as sodium acetate or bicarbonate in a solvent or a mixture of solvents which are strongly polar, such as water, alcohol, dimethylformamide or dimethysulfoxide. The reactants are generally used in equimolar proportions and the reaction is carried out at a temperature of about 20° to 100°C at atmospheric pressure. (Method I).

The preparation of compounds corresponding to formula (VI) is effected in the presence of an organic base of the tertiary amine type in a less polar solvent such as an aromatic hydrocarbon or chlorinated hydrocarbon. Good results are obtained by using triethylamine in benzene or in chloroform. Again, starting with 2-halogeno 4-nitro pyridine N-oxide and a thiol of the formula $R_3SH$, in equimolar proportions, the reaction is carried out at a temperature of about 50° to 100°C at atmospheric pressure. (Method 2).

The preparation of compounds having formula (IX) is effected by substitution of the halogen in position 2 of a 4-chloro 2-halogeno pyridine N-oxide using conditions conventionally employed for effecting nucleophilic reactions with thiols. Thus, there can be used a solvent such as water, alcohol, dimethyl formamide or dimethylsulfoxide, the reaction being carried out in the presence of a base such as the hydroxide, carbonate or alcoholate of an alkali or alkaline earth metal. Normally equimolar proportions of the reactants are utilized, the reaction temperature generally ranges between about 20° to 100°C, and the reaction is effected at ambient pressure. (Method 3).

To obtain compounds corresponding to formula (VII) by beginning with a compound corresponding to formula (VI), it is generally preferable to carry out the reaction in a polar aprotic medium with a solvent such as dimethylformamide, dimethylsulfoxide, acetone, acetonitrile, dioxane or tetrahydrofuran, in the presence of an alkali metal or alkaline earth metal carbonate. (Method 4). These reaction conditions are also the most appropriate for producing directly the compounds of formula (VII) in which the two radicals $R_3$ are identical by double substitution of the halogen in the 2 position and of the nitro in the 4 position of a 2-halogeno 4-nitro pyridine N-oxide.

The preparation of compounds corresponding to formula (VII) beginning with compounds corresponding to formula (V) or formula (IX) is effected generally according to Method 3. The double substitution of 2,4-dihalogeno pyridine N-oxides, to directly produce compounds having formula (VII), in which the two radicals $R_3$ are identical, can be accomplished following the same conditions, but at a more elevated temperature, such as solvent reflux temperature.

The preparation of compounds corresponding to those defined in (b) and (c) of formula (VIII) is effected, according to known methods, by the respective action of essentially equimolar amounts of a N,N-disubstituted dithiocarbamate and of an alkali metal or alkaline earth metal thiocyanate on a compound having formula (V), in a solvent such as acetone or an alcohol such as a lower alkanol, at a temperature of about 20° to 100°C at ambient pressure. Compounds having formula (VIII) which correspond to those defined in (a) thereof, are prepared by the reaction of an essentially equimolar amount of thiourea, substituted or not, with a compound of formula (V) at a temperature of about 20° to 100°C at ambient pressure in the same type of solvent.

These same methods permit the preparation of compounds corresponding to those having formula (X) by starting with 4-chloro 2-halogeno pyridine N-oxide.

The compounds corresponding to definition (d) of formula (VIII) are easily prepared by the reaction of essentially equimolar amounts of an acyl halide with a compound having formula (XI) at a temperature of about 20° to 80°C at atmospheric pressure.

The preparation of compounds having formula (XI) can be effected in two different ways. In a first process, a compound having formula (V) is reacted with an essentially equimolar amount of an alkali metal or alkaline earth metal sulfhydrate or mixtures thereof at a temperature of about 20° to 100°C at atmospheric pressure. The reaction is generally carried out in an aqueous or hydroalcoholic medium, the alcohol used generally being a lower alkanol. The second method consists in hydrolyzing with water a compound having formula (VIII), in the presence of ammonia, or an alkali metal or alkaline earth metal carbonate or hydroxide at a temperature of about 20° to 100°C at atmospheric pressure.

The preparation of the compounds in the sulfone or sulfoxide form can be effected by oxidizing the corresponding thioethers with hydrogen peroxide or an organic per acid. Depending upon the quantity of oxidizing agent used and the reaction temperature, it is possible to obtain either the sulfone or the sulfoxide. Thus a molar ratio of thioether to oxidizing agent in the range of 1:2 to 1:10 at a temperature of 30° to 80°C will yield the corresponding sulfone while a molar ratio of thioether to oxidizing agent in the range of 1:1 to 1:1.5 at a temperature of 0° to 40°C will yield the corresponding sulfoxide.

The preparation of compounds corresponding to formula (III) is effected under prolonged heating in an alcoholic or hydroalcoholic medium of a compound corresponding to those defined in (a) of formula (VIII).

Generally, the reaction temperature ranges from about 50° to 100°C for a period of about ½ to 10 hours. The compounds of formula (III) are also easily obtained by oxidizing compounds having formula (XI) by conventional procedures including using as the oxidizing agent, iodine, a per acid or hydrogen peroxide. Generally, the reaction temperature will be about 0° to 30°C and the oxidizing agent is present in equimolar amounts.

The preparation of compounds corresponding to formulae (IV) and (XII), those being respectively, the metal salts and metal complexes, is effected by adding a mineral or organic salt or of a hydroxide, of the metal that it is desired to salify or complex. Preferably, there is used the acetates or carbonates, preferably in equimolar proportions.

In order to better understand the invention the following examples are given.

EXAMPLES OF PREPARATION

Example 1

4-benzylthio 2-chloro pyridine N-oxide.

a. Starting with 2-chloro 4-nitro pyridine N-oxide.

A suspension of 70 g of 2-chloro 4-nitro pyridine N-oxide in 500 cc of ethanol is heated to 50°C. There are then added with agitation 50 g of benzylmercaptan, then 33 g of sodium acetate in an aqueous alcoholic solution. The resulting mixture is again heated to 50°C until the thiol disappears. Then it is poured into two liters of water. After extraction with chloroform, followed by concentrating the chloroform extracts under reduced pressure, there is obtained an oil which is crystallized by cooling. The crude product is then purified by crystallization in a mixture of benzene and petroleum ether. There are recovered 66 g of pale yellow crystals melting at 108°–110°C.

b. Starting with 4-bromo-2-chloro pyridine N-oxide.

To a hydroalcoholic solution of benzylmercaptan (1.24 g) there are added successively 400 mg of soda, then an aqueous solution (10 ml) of 4-bromo 2-chloro pyridine N-oxide (2.08 g). The resulting mixture is agitated for 6 hours under reflux and then concentrated to dryness under a vacuum. The solid residue is crystallized in a mixture of benzene and petroleum ether and there are obtained 1.9 g of pale yellow crystals melting at 108°–110°C. A mixture of this product with that obtained by method (a) above does not produce any lowering of the melting point.

| Analysis: $C_{12}H_{10}Cl\ NOS$ | | | |
|---|---|---|---|
| | C | H | N |
| Calculated, %: | 57.25 | 4.00 | 5.56 |
| Found, %: | 57.51 | 4.17 | 5.71 |

Example 2

S-(4-benzylthio N-oxypyridyl-2) isothiouronium hydrochloride.

To a boiling solution of 0.02 mole of 4-benzylthio 2-chloro pyridine N-oxide obtained according to Example 1, in 150 cc of isopropanol, there are added 1.52 g of thiourea, while maintaining the boiling of the mixture. After 10 hours of standing at ambient temperature, there are recovered 3.38 g of the above isothiouronium salt which melts at 160°C.

| Analysis: $C_{13}H_{14}Cl\ N_3\ OS_2$ | | | |
|---|---|---|---|
| C | H | N | S |
| Calculated, %: 47.94 | 4.30 | 12.8 | 19.5 |
| Found, %: 47.94 | 4.31 | 12.49 | 19.7 |

Example 3

4-benzylthio N-oxypyridyl-2 thiol.

a. by hydrolysis of the isothiouronium salt of Example 2.

A solution of 3.27 g of the isothiouronium salt obtained in accordance with Example 2 in 100 cc of ethanol (at 50 percent) is treated with 2.12 g of sodium carbonate overnight at ambient temperature. By acidifying with gaseous HCl, 2.3 g of the yellow product precipitates. The product melts at 80°C after crystallization in ethanol.

| Analysis: $C_{12}H_{11}\ NOS_2$ | | |
|---|---|---|
| C | H | N |
| Calculated, %: 57.88 | 4.42 | 5.62 |
| Found, %: 57.74 | 4.09 | 5.57 | b. by starting with 4-benzylthio 2-chloro pyridine N-oxide.

A solution of 3.05 g of sodium sulfhydrate and 2.35 g of sodium sulfide in 30 cc of water is added to 0.05 mole of 4-benzylthio 2-chloropyridine N-oxide obtained in accordance with Example 1, in ethanol. The resulting mixture is heated for three hours under reflux, then acidified with dilute HCl. A yellow product precipitates which is then filtered and washed with water. Yield: 82 percent.

Determination of SH by N/10 iodine =
Found: % 12.8 (Theoretical: 13.2)

Example 3—II 4-benzylsulfonyl N-oxypyridyl-2 thiol.

This compound is obtained using the same conditions in Example 3(b) by replacing the 4-benzylthio 2-chloro pyridine N-oxide with 4-benzylsulfonyl 2-chloro pyridine N-oxide. White crystals melting at 180°C are obtained.

| Analysis | C | H | N | S |
|---|---|---|---|---|
| Calculated, %: | 51.20 | 3.91 | 5.00 | 22.80 |
| Found, %: | 50.83 | 3.92 | 5.35 | 22.87 |

Example 4

S-(2-chloro N-oxypyridyl-4) ethyl thioglycolate.

To a suspension of 70 g of 2-chloro 4-nitro pyridine N-oxide in a liter of ethanol, there are added successively 48 g of ethyl thioglycolate and 200 cc of a hydroalcoholic solution containing 33 g of sodium acetate. The resulting mixture is heated to 50°C until the solution becomes homogeneous. The reaction mixture is then poured into two liters of water and one liter of chloroform. The chloroform solution, concentrated under reduced pressure, yields an oily residue which is then taken up in a mixture of benzene and petroleum ethers. There are thus obtained 78 g of yellow crystals melting at 98°C.

Analysis: $C_9H_{10}ClNO_3S$

|  | C | H | N | S |
|---|---|---|---|---|
| Calculated, %: | 43.70 | 4.04 | 5.66 | 12.90 |
| Found, %: | 43.53 | 4.16 | 5.68 | 13.31 |

Example 5

S-(2-chloro N-oxypyridyl-4) methyl thioglycolate.

Example 4 is repeated except that the ethyl thioglycolate is replaced with methyl thioglycolate. Yield: 61 percent, melting point: 134°C.

Analysis: $C_8H_9Cl NO_3S$

|  | C | H | N |
|---|---|---|---|
| Calculated, %: | 41.20 | 3.43 | 6.00 |
| Found, %: | 41.21 | 3.64 | 6.01 |

Example 6

2-chloro 4-(2,3 dihydroxy propylthio) pyridine N-oxide.

Example 4 is repeated except that the ethyl thioglycolate is replaced with thioglycerol. Yield: 72 percent, melting point: 130°C.

Analysis: $C_8H_{10}CL NO_3S$

|  | C | H | N |
|---|---|---|---|
| Calculated, %: | 40.80 | 4.26 | 6.22 |
| Found, %: | 40.49 | 4.18 | 5.92 |

Example 7

S-(2-mercapto N-oxypyridyl-4) methyl thioglycolate.

a. Sulfhydrate method.

An aqueous solution containing 0.3 g of sodium sulfhydrate and 0.3 g of sodium sulfide is added to a solution of 9.5 millimoles of S-(2-chloro N-oxypyridyl-4) methyl thioglycolate, obtained in accordance with Example 5, in 50 ml of ethanol. After heating the resulting mixture to reflux for 3 hours, the solution is acidified to a pH of 2.0 by the addition thereto of an aqueous solution of HCl. The product precipitates, is filtered, washed with water and exhibits a melting point of 90°C. Yield: 87 percent.

Analysis: $C_8H_9NO_3S_2$

|  | C | H | N | S |
|---|---|---|---|---|
| Calculated, %: | 41.54 | 3.92 | 6.06 | 27.73 |
| Found, %: | 41.58 | 4.11 | 6.06 | 27.66 | b. Thiourea method.

A boiling solution of 0.76 g of thiourea in 40 ml of isopropanol is added to a solution of 10 millimoles of S-(2-chloro N-oxypyridyl-4) methyl thioglycolate, obtained in accordance with Example 5, in isopropanol. The resulting mixture is left to stand for 12 hours at ambient temperature. There is then added to this mixture an aqueous solution of potassium carbonate. After 2 hours at ambient temperature the solution is acidified by the addition thereto to dilute HCl. There are recovered 1.25 g of precipitate, melting at 90°C.

Example 8

2-chloro 4-dodecylthio pyridine N-oxide and 2-dodecylthio 4-nitro pyridine N-oxide.

A suspension of 10.5 g of 2-chloro 4-nitro pyridine N-oxide, of 12.1 g of dodecanethiol and of 8.4 g of potassium carbonate in 100 ml of dimethyl formamide is heated for 1 hour at 50°C under good agitation. After cooling and filtering to eliminate the mineral salts, the solution is concentrated under a vacuum. The residue is extracted with a sulfuric ether solution; the insoluble fraction in the ether is filtered and crystallized in alcohol to provide bright yellow crystals (3.45 g) melting at 100.5°C and corresponding to 2-dodecylthio 4-nitro pyridine oxide.

Analysis: $C_{17}H_{28}N_2O_3S$

|  | C | H | N | S |
|---|---|---|---|---|
| Calculated, %: | 60.15 | 8.24 | 8.24 | 9.41 |
| Found, %: | 60.01 | 8.26 | 8.10 | 9.80 |

The solution resulting from the ether extraction is then concentrated to yield an oil which crystallizes when cooled. The crude product crystallizes in petroleum ether to yield pale yellow crystals (10.85 g) melting at 40°C and corresponding to 2-chloro 4-dodecylthio pyridine N-oxide.

Analysis: $C_{17}H_{28}Cl NOS$

|  | C | H | N |
|---|---|---|---|
| Calculated, %: | 61.90 | 8.50 | 4.25 |
| Found, %: | 62.01 | 8.70 | 4.14 |

Example 9

| 2-chloro 4-tetradecylthio pyridine N-oxide and | (1) |
| 4-nitro 2-tetradecylthio pyridine N-oxide | (2) |

Example 8 is repeated except that the dodecanethiol is replaced with 19.5 g of tetradecanethiol. There are obtained, respectively, 21.25 g of 2-chloro 4-tetradecylthio pyridine N-oxide (1), crystallized in petroleum ether in the form of yellowish crystals (M.P = 55°C) and 6.10 g of 4-nitro 2-tetradecylthio pyridine N-oxide (2), crystallized in ethanol in the form of yellow crystals (M.P. = 110.5°C).

Analysis (1) $C_{19}H_{32}Cl NOS$

|  | N | S |
|---|---|---|
| Calculated, %: | 3.92 | 8.95 |
| Found, %: | 3.96 | 8.91 |

(2) $C_{19}H_{32}N_2O_3S$

|  | N | S |
|---|---|---|
| Calculated, %: | 7.60 | 8.70 |
| Found, %: | 7.66 | 8.67 |

Example 10

4-dodecylthio N-oxypyridyl-2 thiol.

To 40 millimoles of 2-chloro 4-dodecylthio pyridine N-oxide, obtained in accordance with Example 8, in 150 ml of ethanol there is added a solution of 4 g of potassium sulfhydrate in 50 ml of water. The resulting mixture is heated under reflux for 3 hours and then left to stand several days at ambient temperature under a nitrogen atmosphere. After acidification of the solution, 11.2 g of the above thiol precipitate which is then crystallized in ethanol. The resulting product exhibits a melting point of 70°C. Dosage by an iodine solution: SH percent = 9.85 (theoretical: 10.1 percent).

Example 11

2-chloro 4-hexadecylthio pyridine N-oxide.

Employing the same conditions in Example 8, the reaction of 17.5 g of 2-chloro 4-nitro pyridine N-oxide and of 28.5 g of hexadecanethiol in dimethyl formamide in the presence of potassium carbonates yields 26.6 g of the above compound which, after crystallization in hexane, melts at 60°C.

| Analysis: $C_{21}H_{36}ClNOS$ | | | |
|---|---|---|---|
| | C | H | N |
| Calculated, %: | 65.40 | 9.34 | 3.63 |
| Found, %: | 65.33 | 9.28 | 3.33 |

There is also obtained as a secondary reaction product, 2.5 g of 2-hexadecylthio 4-nitro pyridine N-oxide melting at 102°C after crystallization in alcohol.

Example 12

4-dodecylthio N-oxypyridyl-2 zinc thiolate.

a. Starting with the thiol of Example 1.

An aqueous solution of zinc acetate dihydrate (7.5 millimoles) is added to an alcoholic solution of the thiol (15 millimoles) obtained in Example 1. The white precipitate formed is recovered and washed with water. Yield = 91 percent.

| Determination - Zn% | Calculated: | 9.1 |
|---|---|---|
| | Found: | 8.9 | b. Starting with the compound obtained in Example 8 by way of the isothiouronium salt.

10 millimoles of the compound obtained according to Example 8 and 10 millimoles of thiourea are heated under reflux in acetone for 60 minutes. On cooling the isothiouronium salt crystallizes. Yield = 89 percent, melting point - 179°C.

0.65 g of the isothiouronium salt in an alcohol solution is treated for 60 minutes at ambient temperature with an aqueous solution containing 2 millimoles of soda. By adding thereto 0.22 g of zinc acetate dihydrate in a little water, the above zinc salt precipitates immediately. Weight obtained = 0.5 g. Determination — Zn%, Calculated — 9.1, Found — 9.2.

Example 13

S-(4-phenylthio N-oxypyridyl-2) mercaptoacetic acid.

There are added successivly 0.1 mole of thiophenol and an equivalent of sodium acetate in hydroalcoholic solution to a well agitated suspension of 2-chloro 4-nitro pyridine N-oxide (0.1 mole) in alcohol. The agitation is continued for 2 hours and the mixture is then poured into water and extracted with ether. The etherified solution is dried and concentrated: the residual yellow oil is agitated for 90 minutes at 70°C with 9.2 g of thioglycolic acid and 22.5 g of potassium carbonate in dimethylformamide (200 ml). The resulting precipitate is filtered, washed with ether and taken up in water. After acidification of this aqueous solution, the above acid precipitates. 18 g of the above product are recovered which exhibits a melting point of 214°C after crystallization in ethanol.

| Analysis: $C_{13}H_{11}NO_3S_2$ | | | |
|---|---|---|---|
| | C | H | N |
| Calculated, %: | 53.21 | 3.75 | 4.78 |
| Found, %: | 53.15 | 3.76 | 4.84 |

Example 14

S-[4-(2-ethyl hexylthio) H-oxypyridyl-2] mercaptoacetic acid.

This compound is obtained using the same conditions set forth in Example 13, by replacing the thiophenol with 2-ethyl hexanethiol. There are thus obtained white crystals (benzene) exhibiting a melting point of 124°C.

| Analysis: $C_{15}H_{23}NO_3S_2$ | | | |
|---|---|---|---|
| | C | H | N |
| Calculated, %: | 54.71 | 6.98 | 4.25 |
| Found, %: | 54.42 | 7.00 | 3.99 |

Example 15

S-(4-dodecylthio N-oxypyridyl-2) mercaptoacetic acid.

1.65 g of 2-chloro 4-dodecylthio pyridine N-oxide obtained in accordance with Example 8 and 0.49 g of thioglycolic acid are added to a solution of 0.23 g of sodium in 100 cc of ethanol. The mixture is heated for 2 hours under reflux. The ethanol is then distilled off and the residue, taken up in water, is filtered and the aqueous solution is acidified, producing as a precipitate, the above acid, in amounts of 1.50 g. The product exhibits a melting point of 134°C.

| Analysis: $C_{19}H_{31}NO_3S_2$ | | | |
|---|---|---|---|
| | C | H | N |
| Calculated, %: | 59.30 | 8.05 | 3.64 |
| Found, %: | 59.36 | 8.08 | 3.61 |

Example 16

S-(4-tetradecylthio N-oxypyridyl-2) mercaptoacetic acid.

Example 15 is repeated except that the 2-chloro 4-dodecylthio pyridine N-oxide is replaced by 2-chloro 4-tetradecylthio pyridine N-oxide to produce the above acid in the form of white crystals (ethanol) melting at 120°C.

Example 17

S-(4-octadecylthio N-oxypyridyl-2) mercaptoacetic acid.

Example 15 is repeated except that the 2-chloro 4-dodecylthio pyridine N-oxide is replaced by 2-chloro 4-octadecylthio pyridine N-oxide to produce the above acid in the form of white crystals (ethanol) melting at 128°–130°C.

Example 18

3-(4-dodecylthio N-oxypyridyl-2) propionic acid.

To a solution of 4.5 g of 2-chloro 4-dodecylthio pyridine N-oxide, obtained in accordance with Example 8, in ethanol, there are added 1.45 g of β-mercaptopropionic acid. To this, there is slowly added a solution of 1.1 g of soda in 40 ml of water. The resulting mixture is agitated for 30 minutes, filtered and acidified to a pH of 3 by the addition thereto of dilute HCl 4.35 g of the above acid, as a white precipitate, are recovered, the product melting at 125°C.

| Analysis: $C_{20}H_{33}NO_3S_2$ | | |
|---|---|---|
| C | H | N |
| Calculated, %: 60.11 | 8.35 | 3.51 |
| Found, %: 59.86 | 8.09 | 3.27 |

Example 19

S-[4-benzylthio N-oxypyridyl-2] cysteine.

Example 18 is repeated except that the β-mercaptoacetic acid is replaced by cysteine hydrochloride to produce the above white monohydrate product which decomposes at about 210°C.

| Analysis: $C_{15}H_{16}N_2O_3S_2 \cdot H_2O$ | | |
|---|---|---|
| C | H | N |
| Calculated, %: 50.85 | 5.08 | 7.91 |
| Found, %: 50.75 | 4.97 | 7.99 |

Example 20

2-benzylthio 4-nitro pyridine N-oxide.

To a suspension of 34.95 g of 2-chloro 4-nitro pyridine N-oxide in a boiling liter of benzene, there are added 24.8 g of benzylmercaptan and 20.2 g of triethylamine over a 30 minute period. The resulting mixture is heated for a few hours under reflux, after which the triethylamine hydrochloride is separated by filtration. The filtrate is cooled yielding 39.2 g of the above as a yellow orange precipitate, having a melting point of 160°C.

| Analysis: $C_{12}H_{10}N_2O_3S$ | | | |
|---|---|---|---|
| C | H | N | S |
| Calculated, %: 55.01 | 3.83 | 10.68 | 12.21 |
| Found, %: 55.18 | 3.96 | 10.50 | 12.16 |

Example 21

4-nitro 2-phenylthio pyridine N-oxide.

Example 20 is repeated except that the benzylmercaptan is replaced by thiophenol to produce the above compound in the form of yellow crystals (ethanol) in a yield of 66 percent and having a melting point of 198°C.

Example 22

(4-nitro N-oxypyridyl-2) mercaptoacetic acid.

The conditions of Example 20 are repeated using as the initial reactants thioglycolic acid and 2-chloro 4-nitro pyridine N-oxide, thus producing the above acid in a 78 percent yield and having a melting point of 240°C.

| Analysis: $C_7H_6N_2O_5S$ | | | |
|---|---|---|---|
| C | H | N | S |
| Calculated, %: 36.53 | 2.63 | 12.17 | 13.91 |
| Found, %: 36.40 | 2.79 | 12.43 | 13.84 |

Example 23

Bis-2,4-(benzylthio) pyridine N-oxide.

A mixture of 0.05 mole of 2-chloro 4-nitro pyridine N-oxide, 0.1 mole of benzylmercaptan and 0.05 mole of sodium carbonate in 100 ml of dimethylformamide is heated for 3 hours at 70°C. After filtration and evaporation to dryness under a vacuum, the above white product, having a melting point of 160°C, is obtained from crystallization in benzene in a yield of 93 percent.

| Analysis: $C_{19}H_{17}NOS_2$ | | |
|---|---|---|
| C | H | N |
| Calculated, %: 67.22 | 5.04 | 4.12 |
| Found, %: 67.46 | 5.03 | 3.75 |

Example 24

S-(4-chloro N-oxypyridyl-2) cysteine.

There is heated for 2 hours and 30 minutes at 45°C a mixture of 5.0 g of 2,4-dichloro pyridine N-oxide, 5.35 g of cysteine hydrochloride monohydrate, 6.0 g of 85 percent potash and 100 ml absolute methanol. The resulting mixture is left to stand overnight at ambient temperature and the resulting gelled solution is treated with 100 ml of water, acidified to pH 5 by the addition thereto of dilute HCl and concentrated to half its original volume. A white precipitate, the above cysteine, in amounts of 5.4 g, results which is then filtered and crystallized in water. This product has a melting point of 220°C (decomposition) and retains one mole of water of crystallization.

Example 25

S-(4-chloro N-oxypyridyl) methyl cysteinate dihydrochloride.

A stream of dry gaseous HCl is bubbled into a suspension of 3 g of the amino acid, obtained in Example 14, in methanol (100 ml) until the same is saturated. The above dihydrochloride (3.5 g) is obtained from this solution as a precipitate in the form of white crystals (ethanol), having a melting point of 175°C.

| Analysis: $C_8H_9ClN_2O_3S \cdot H_2O$ | | |
|---|---|---|
| | C | H | N |
| Calculated, %: | 36.02 | 4.15 | 10.50 |
| Found, %: | 36.22 | 4.10 | 10.10 |

| Analysis: | | |
|---|---|---|
| | C | H | N |
| Calculated, %: | 32.20 | 3.90 | 8.34 |
| Found, %: | 31.92 | 3.96 | 8.33 |

Example 26

S-(4-chloro N-oxypyridyl-2) isothiouronium chloride.

A solution of 4.5 g of 2,4-dichloro pyridine N-oxide and 2.1 g of thiourea in isopropanol is heated for 1 minute at the boil. After letting the resulting solution stand for 12 hours at ambient temperature, the above chloride in the form of crystals are filtered and washed with ethanol. The product in a 94.5 percent yield exhibits a melting point of 180°C (decomposition).

| Analysis: $C_6H_7Cl_2N_3OS$ | | | | |
|---|---|---|---|---|
| | C | H | N | S | Cl |
| Calculated, %: | 30.00 | 2.92 | 17.50 | 13.32 | 14.8 |
| Found, %: | 30.00 | 3.29 | 17.77 | 13.90 | 15.0 |

Example 27

4-chloro N-oxypyridyl-2thiol.

5 millimoles of the isothiouronium salt prepared in accordance with Example 26 are hydrolyzed at ambient temperature by a solution of potassium carbonate. The above thiol is recovered in a yield of 80 percent from the reaction mixture, by the addition thereto of dilute HCl, in the form of a white precipitate which is subsequently filtered therefrom. The product exhibits a melting point of 75°C.

| Analysis: $C_5H_4ClNOS$ | | |
|---|---|---|
| | C | H | N |
| Calculated, %: | 37.16 | 2.49 | 8.67 |
| Found, %: | 37.47 | 2.72 | 8.71 |

Example 28

4-p-chlorophenylthio N-oxypyridyl-2 disulfide.

0.01 mole of 2-chloro 4-p-chlorophenylthio pyridine N-oxide is dissolved in boiling isopropanol. To this solution there is added a boiling solution of 0.01 mole of thiourea in isopropanol. The mixture is heated under reflux for 5 minutes and is then left to stand for 15 hours at ambient temperature. After filtration, the above disulfide is recovered which exhibits a melting point with decomposition of 250°C.

| Analysis: $C_{22}H_{14}Cl_2N_2O_2S_4$ | | |
|---|---|---|
| | C | H | N |
| Calculated, %: | 49.16 | 2.63 | 5.21 |
| Found, %: | 49.45 | 2.82 | 5.25 |

Example 29

N,N-dimethyl-dithiocarbamate of 4-chloro N-oxypyridyl-2.

A mixture of 3.28 g of 2,4-dichlor pyridine N-oxide and 2.86 g of sodium N,N-dimethyl dithiocarbamate in 200 ml of acetone is agitated for 4 hours at 50°C. After filtration, the acetonic solution is concentrated to dryness. The oil residue is crystallized in absolute methanol producing yellow crystals (4.5 g) of the above product which melts with decomposition at 140°C.

| Analysis: $C_8H_5ClN_2OS_2$ | | | |
|---|---|---|---|
| | C | H | N | S |
| Calculated, %: | 38.62 | 3.64 | 11.26 | 25.78 |
| Found, %: | 38.41 | 3.83 | 11.56 | 28.88 |

EXample 30

4-dodecylthio N-oxypyridyl-2 thiocyanate.

A mixture in ethanol of 11 g of 2-chloro 4-dodecylthio pyridine N-oxide, obtained in accordance with Example 8, and 9.7 g of potassium thiocyanate is agitated for 2 hours at 80°C.

The resulting mixture is left overnight at ambient temperature, filtered and concentrated. The residue is then recrystallized in acetonitrile producing white needlelike crystals. This product melts at 78° C. Analysis reveals that it is an addition compound carrying one mole of potassium chloride.

| Analysis: | | |
|---|---|---|
| | Cl | N | S |
| Calculated, %: | 8.30 | 6.33 | 14.45 |
| Found, %: | 8.25 | 6.29 | 14.41 |

Example 31

S-(2-dodecylthio N-oxypyridyl-4) mercaptoacetic acid.

A mixture of 1.7 g of 2-dodecylthio 4-nitro pyridine N-oxide, 650 mg of potassium carbonate and 490 g of thioglycolic acid in dimethylformamide is agitated for 4 hours at 70°C. The precipitate which forms is filtered, washed with ether and dissolved in water. The resulting yellow solution is then acidified by the addition thereto of concentrated HCl The above product precipitates and is recovered by filtration for a 76 percent yield. The product exhibits a melting point of 98°C.

| Analysis: | C | H |
|---|---|---|
| Calculated, %: | 59.18 | 8.05 |
| Found, %: | 59.05 | 8.07 |

Example 32

4-butylsulfonyl 2-chloropyridine N-oxide.

A suspension containing 8.75 g of 2-chloro 4- nitro pyridine N-oxide and 4 g of butylmercaptan in 200 cc of a water-alcohol mixture is heated for 2 hours at the boil in the presence of 4.1 g of sodium acetate trihydrate. The mixture is evaporated to dryness and the product is taken up in chloroform. After filtration, the chloroform solution is concentrated and the oil residue (7 g) is treated with 20 cc of $H_2O_2$ (30%) in 50 cc of acetic acid for 6 hours at 50°c. With the addition thereto of water, a white precipitate is formed, thus porviding 6.25 g of the above product which providing at 100°C.

| Analysis: | C | H | N |
|---|---|---|---|
| Calculated, %: | 43.28 | 4.84 | 5.60 |
| Found, %: | 43.38 | 5.04 | 5.64 |

Example 33

4-methylsulfonyl 2-chloro pyridine N-oxide.

Example 22 is repeated except that the butylmercaptan is replaced by methylmercaptan, thus producing the above product in the form of white crystals (ethanol) having a melting point of 176°C.

| Analysis: $C_6H_6ClNO_3S$ | C | H | N |
|---|---|---|---|
| Calculated, %: | 34.60 | 2.88 | 6.72 |
| Found, %: | 34.61 | 3.10 | 6.71 |

Example 34

S-(4-nitro N-oxypyridyl-2) mercaptoacetic acid.

3.68 g of thioglycolic acid and 8.08 g of triethylamine are added successively to a solution of 9.76 g of 2-bromo 4-nitro pyridine N-oxide in 30 ml of chloroform. The mixture is heated for 5 hours under reflux and it is then poured into a dilute aqueous HCl solution. The resulting precipitate is filtered therefrom and crystallized in water to provide a 76 percent yield of the above product in the form of pale yellow platelets, having a melting point of 245°C.

Example 35

4-chloro 2-phenylthio pyridine N-oxide.

A hydroalcoholic solution of benzylmercaptan (3.12 g) is neutralized by the addition thereto of 1.2 g of soda. There is then added to this neutralized solution a solution of 2,4-dichloro pyridine N-oxide (4.92 g) in water (50 ml). A precipitate progressively forms in the course of the reaction, which on completion of the same is recovered by filtration and crystallized in ethanol. 6.5 g of the above product in the form of white needles are produced, said product exhibiting a melting point of 168°C.

| Analysis: $C_{12}H_{10}ClNOS$ | C | H | N |
|---|---|---|---|
| Calculated, %: | 57.25 | 4.00 | 5.66 |
| Found, %: | 57.28 | 4.28 | 5.48 |

Example 36

2-benzylsulfonyl 4-nitro pyridine N-oxide.

5.24 g of 2 -benzylthio 4-nitro pyridine N-oxide are placed in suspension in 20 ml of formic acid. To this suspension there are slowly added 5 ml of $H_2O_2$ (110 volumes) and the resulting mixture is heated at 50°C while agitating the same. The precipitate which forms is filtered, washed with ether and crystallized in acetic acid to provide whitish crystals (90 percent yield) melting at 185°C.

| Analysis: $C_{12}H_{10}N_2O_5S$ | S | C | H | N |
|---|---|---|---|---|
| Calculated, %: | 11.12 | 49.99 | 3.49 | 9.71 |
| Found, %: | 10.98 | 49.67 | 3.64 | 9.85 |

Example 37

Bis-2,4-(benzylsulfonyl)pyridine N-oxide.

A solution of 5 millimoles of 4-benzylsulfonyl 2-benzylthio pyridine N-oxide in 10 ml of acetic acid is heated for 3 hours at 50°C with 3 ml of $H_2O_2$ (110 volumes). A precipitate forms which is then filtered and crystallized in acetic acid producing in a 63 percent yield the above product as whitish crystals exhibiting a melting point of 212°C.

| Analysis: $C_{19}H_{17}NO_5S_2$ | C | H | N | S |
|---|---|---|---|---|
| Calculated, %: | 56.55 | 4.24 | 3.47 | 15.89 |
| Found, %: | 56.53 | 4.22 | 3.38 | 15.92 |

Example 38

2-benzylsulfinyl 4-benzylsulfonyl pyridine N-oxide.

a solution of 5 millimoles of 4-benzylsulfonyl 2-benzylthio pyridine N-oxide in 10 ml of acetic acid is agitated with 0.5 ml of $H_2O_2$ (30%) for a few hours at ambient temperature. The product of the reaction precipitates by the addition thereto of water. After filtration, the precipitate is washed with ether and crystallized in dilute acetic acid to provide the above product in the form of white crystals melting at 205°C. Yield — 88 percent.

| Analysis: $C_{19}H_{17}NO_4S_2$ | | |
|---|---|---|
| | C | H | N |
| Calculated, %: | 58.89 | 4.42 | 3.61 |
| Found, %: | 58.75 | 4.58 | 3.34 |

Example 39

2-benzylsulfinyl 4-nitro pyridine N-oxide.

To a suspension of 2.62 g of 2-benzylthio 4-nitro pyridine N-oxide in 30 ml of formic acid there is added 1 ml of $H_2O_2$ (110 volumes). The mixture is agitated until dissolution of the reactants is achieved, after which the mixture is concentrated. The above product precipitates on the addition of water to the reaction mixture. The precipitate is recovered therefrom by filtration and recrystallized in a water-alcohol mixture to produce yellow needle-like crystals having a melting point of 151°c.

| Analysis: $C_{12}H_{10}N_2O_4S$ | | | |
|---|---|---|---|
| | C | H | N | S |
| Calculated, %: | 51.79 | 3.62 | 10.06 | 11.52 |
| Found, %: | 51.68 | 3.83 | 9.97 | 11.83 |

Example 40

4-benzylthiosulfonyl 2-benzylthio pyridine N-oxide.

A solution of 20 millimoles of 4-benzylsulfonyl 2-chloro pyridine N-oxide in dimethylformamide (50 ml) is agitated for 3 hours at 70°C with 20 millimoles of benzylmercaptan and 1.38 g of potassium carbonate. After filtration and partial evaporation of the filtrate, the above product precipitates. The precipitate is recovered by filtration and is crystallized, thus producing white needle-like crystals (ethanol) melting at 140°C.

Example 41

4-benzylsulfinyl 2-chloro pyridine N-oxide.

Example 39 is repeated except that the 2-benzylthio 4-nitro pyridine N-oxide is replaced with 4-benzylthio 2-chloro pyridine N-oxide, thus producing the above product in the form of white needle-like crystals (isopropanol) melting at 158°C.

Example 42

Bis-(2,4-benzylsulfinyl)pyridine N-oxide. 500 mg of bis-(2,4-benzylthio) pyridine N-oxide in formic acid (6 ml) are treated with 0.3 ml of $H_2O_2$ (30%) at ambient temperature. The mixture is agitated until there is a complete absence of the peroxide. After evaporation to dryness, the residue is taken up in water, filtered and recrystallized in isopropanol, thus yielding white crystals having a melting point of 178°C.

| Analysis: $C_{19}H_{17}NO_3S_2$ | | |
|---|---|---|
| | C | H | N |
| Calculated, %: | 61.43 | 4.61 | 3.77 |
| Found %: | 61.32 | 4.45 | 3.67 |

Example 43

4-benzylsulfinyl 2-benzylsulfonyl pyridine N-oxide.

A solution of 1.70 g of bis-(2,4-benzylthio) pyridine N-oxide in acetic acid is agitated with 1.5 ml of $H_2O_2$ (30%) until the peroxide disappears. On the addition thereto of water, a precipitate forms and after recrystallization, the above product, white in color, is obtained, which product exhibits a melting point of 190°C (ethanol).

| Analysis: $C_{19}H_{17}NO_4S_2$ | | | |
|---|---|---|---|
| | C | H | N | S |
| Calculated, %: | 58.89 | 4.42 | 3.61 | 16.55 |
| Found, %: | 58.60 | 4.53 | 3.56 | 16.25 |

COMPOSITION EXAMPLES

Example 44

A sprayable aerosol feminine hygiene composition packaged under pressure in a conventional aerosol container comprises the following admixture:

| | |
|---|---|
| cetyl trimethyl ammonium bromide | 0.1 g |
| sorbitan polyoxyethylene monooleate (Tween 80) | 0.4 g |
| ethyl alcohol | 5 g |
| perfume | 0.1 g |
| 2-chloro 4-hexadecylthio pyridine N-oxide (compound No. 6) | 1 g |
| dichlorodifluoromethane, q.s.p. | 100 g |

Other sprayable feminine hygiene compositions are prepared as above except that the active component, 2-chloro 4-hexadecylthio pyridine N-oxide is replace by the following compounds of the present invention, identified heretofore as compounds Nos. 29, 30, 32, 35 14 41, 46, 49–51 and 106–113.

Example 45

A personal deodorant talc comprises the following mixture:

| | |
|---|---|
| talc | 99 g |
| glycerine oleate | 3 g |
| isopropyl myristate | 7 g |
| S-(2-chloro N-oxypyridyl-4) ethyl thioglycolate (Compound 2) | 3 g |
| perfume | 2 cc |

10 g of the above admixture is provided in the form of a sprayable aerosol talc by packaging the same under pressure in a conventional aerosol container together with, as the aerosol propellant, a mixture of 45 g of trichloromonofluoromethane and 45 g of dichlorodifluoromethane.

Other equally effective sprayable talc compositions identical to the above are prepared except that the active component S-(2-chloro N-oxypyridyl-4) ethyl thioglycolate (Compound 2) is replaced by the following active compounds of this invention which are identified above as Compounds Nos. 54, 56, 57–68 and 113–118.

Example 46

An aqueous deodorant stick, having the following composition is prepared:

| | |
|---|---|
| sodium stearate | 5 g |
| propylene glycol | 60 g |
| glycerine | 5 g |
| the zinc salt of S-(2-mercapto N-oxypyridyl-4) methyl thioglycolate (Compound 22) | 2 g |
| perfume | 0.5 g |
| water, q.s.p. | 100 g |

Other equally effective and similar compositions are prepared by replacing the above zinc salt in the above formulation with the following active compounds of this invention which are identified above as Compounds Nos. 52, 99 and 119.

Example 47

| | |
|---|---|
| bis-2,4 (benzylthio) pyridine N-oxide (Compound 15) | 2 g |
| titanium oxide | 10 g |
| red iron oxide | 0.3 g |
| yellow iron oxide | 0.2 g |
| brown iron oxide | 0.4 g |
| chestnut iron oxide | 0.2 g |
| cetyl stearyl alcohol oxyethylenated with 33 moles of ethylene oxide | 7 g |
| polyglycol stearate | 6 g |
| propyl parahydroxybenzoate | 0.2 g |
| water, q.s.p. | 100 g |

Other creams identical to that described immediately above, are prepared, by replacing compound 15 with the following active compounds of this invention identified heretofore as compounds Nos. 52 and 99.

Example 48

A deodorant toilet water in accordance with the present invention is prepared by admixing:

| | |
|---|---|
| S-(4-chloro N-oxypyridyl-2) isothiouronium chloride (Compound 19) | 2 g |
| perfume | 1 g |
| absolute ethyl alcohol | 50 cc |
| water, q.s.p. | 100 cc |

Other deodorant toilet water compositions, identical to that above are prepared using instead of Compound 19, the following active compounds of this invention identified above as compounds Nos. 42 and 100.

Example 49

A liquid shampoo composition in accordance with the present invention is prepared by mixing together: methyl thioglycolate.

| | |
|---|---|
| sodium lauryl sulfate oxyethylenated with 2.2 moles of ethylene oxide | 9 g |
| sodium monolauryl sulfosuccinate | 1 g |
| polyethylene glycol distearate | 2 g |
| lauryl diethanolamide | 2 g |
| S-(4-phenylthio N-oxypyridyl-2) mercaptoacetamide (Compound 12) | 2 g |
| perfume | 0.3 g |
| lactic acid, q.s.p. pH 6 | |
| water, q.s.p. | 100 g |

Other shampoos, identical to that above, are prepared using instead of Compound 12, the following active compound of this invention identified above as compound No. 34.

Example 50

A shampoo composition in powder form is prepared by mixing together:

| | |
|---|---|
| sodium lauryl sulfate | 50 g |
| the product of condensation of copra fatty acids on sodium isethionate (sold under the tradename "Hostapon K.A." by the Hoechst company and having the formula R—COO—CH$_2$—CH$_2$SO$_3$Na, wherein R represents the copra radical C$_5$ to C$_{17}$) | 41 g |
| S-(4-methyl sulfonyl N-oxypyridyl-2) methyl cysteinate hydrochloride (Compound 26) | 8 g |
| perfume | 1 g |

At the moment of use, the above powdered shampoo is dissolved in ten times its weight of water and the resulting solution is applied to the hair with very effective results.

Other powdered shampoo compositions, identical to that above, are prepared using instead of Compound 26, the following active compounds of this invention identified heretofore as Compounds Nos. 70, 71, 73–97 and 101–104.

Example 51

A liquid anionic shampoo composition of the present invention is prepared by admixing:

| | |
|---|---|
| Technical (100%) triethanolamine lauryl sulfate | 7 g |
| Coprah diethanolamide | 2 g |
| Carboxypolymethylene | 0.9 g |
| 4-dodecylthio N-oxypyridyl-2 sodium thiolate (Compound 27) | 2 g |
| Carboxymethyl cellulose | 0.3 g |
| perfume | 0.5 g |
| Dye (F.D.C. Green No. 3 having the empirical formula C$_{37}$H$_{34}$N$_2$O$_{10}$S$_3$Na$_2$) | 0.1 g |
| Water, q.s.p. | 100 g |

Other equally effective shampoo compositions, identical to that described immediately above are prepared using instead of Compound 27, the following active compounds of this invention, identified hereinbefore as compounds Nos. 44 and 75.

Example 52

A capillary lotion for greasy hair is prepared by mixing:

| | |
|---|---|
| S-(4-chloro N-oxypyridyl-2) cysteine (Compound 18) | 3 g |
| Hydroalcoholic solution (50%-ethanol) | 100 cc |

Other capillary lotion compositions, identical to that above are prepared using instead of Compound 18, the following active compounds of this invention identified above as Compounds Nos. 31 and 98.

Example 53

A men's hair dressing lotion is prepared by mixing:

| | |
|---|---|
| 2,2'-dithio bis-(4-chloro pyridine N-oxide) (Compound 105) | 0.75 g |
| Dimethylhydantoin formol resin | 0.5 g |
| Dimethyl dilaurylammonium chloride | 0.5 g |
| Perfume | 0.1 g |
| Alcohol (ethanol) | 50 cc |
| Water, q.s.p. | 100 cc |

Other hair dressing lotion compositions, identical to that above, are prepared by replacing Compound 105 with the following active compounds of this invention

Example 54

A dermatological cake is prepared by mixing together the following components:

| | |
|---|---|
| Esters of sodium isethionate and copra fatty acids (sold under the tradename "IGEPON A" having the formula R-COO-CH$_2$-CH$_2$-SO$_3$Na, wherein R = fatty acid derivative having 12 to 18 carbon atoms) | 75 g |
| Lanolin derivatives (sold by CRODA under the trademark "SUPER HARTOLAN" and lecithin - pale yellow solid wax, min. melting point-60°C, amt. of cholesterol- 30-36%) | 23 g |
| 2-hexadecyl thio 4-nitro pyridine N-oxide (Compound 8) | 2 g |

Other dermatological cakes, identical to that above, are prepared by replacing Compound 8 with the following active compounds of this invention identified above as Compounds Nos. 34, 35, 43, 48, 55, 72 and 123–126;

What is claimed is:

1. A composition for application to the skin or scalp, said composition having fungicidal, bactericidal and deodorizing characteristics comprising a carrier selected from the group consisting of water, a lower alkanol selected from the group consisting of ethanol isopropanol, an aqueous solution of said lower alkanol wherein said lower alkanol is present in amounts of about 20–70 percent by weight of said solution, talc and detergent: and 0.01–10 percent by weight of said composition of an active component having the formula

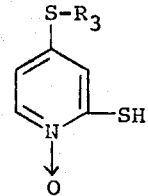

wherein R$_3$ is —(CH$_2$)$_n$—COR$_6$ wherein R$_6$ is selected from the group consisting of OH and —O—R'$_6$ wherein R'$_6$ is alkyl having 1–4 carbon atoms, and $n$ is 1–10 inclusive.

2. The composition of claim 1 wherein said active component is present in amounts of 0.1–3 percent by weight of said composition.

3. The composition of claim 1 wherein said active component is S-(2-mercapto N-oxypyridyl-4) methylthioglycolate.

4. The composition of claim 1 wherein said carrier is said lower alkanol and said composition also includes an aerosol propellant, said composition being packaged under pressure in an aerosol container.

* * * * *